Nov. 11, 1958  M. KNOPF ET AL  2,859,621
AIRCRAFT CONTROL INSPECTION DEVICE
Filed April 28, 1955  5 Sheets-Sheet 1
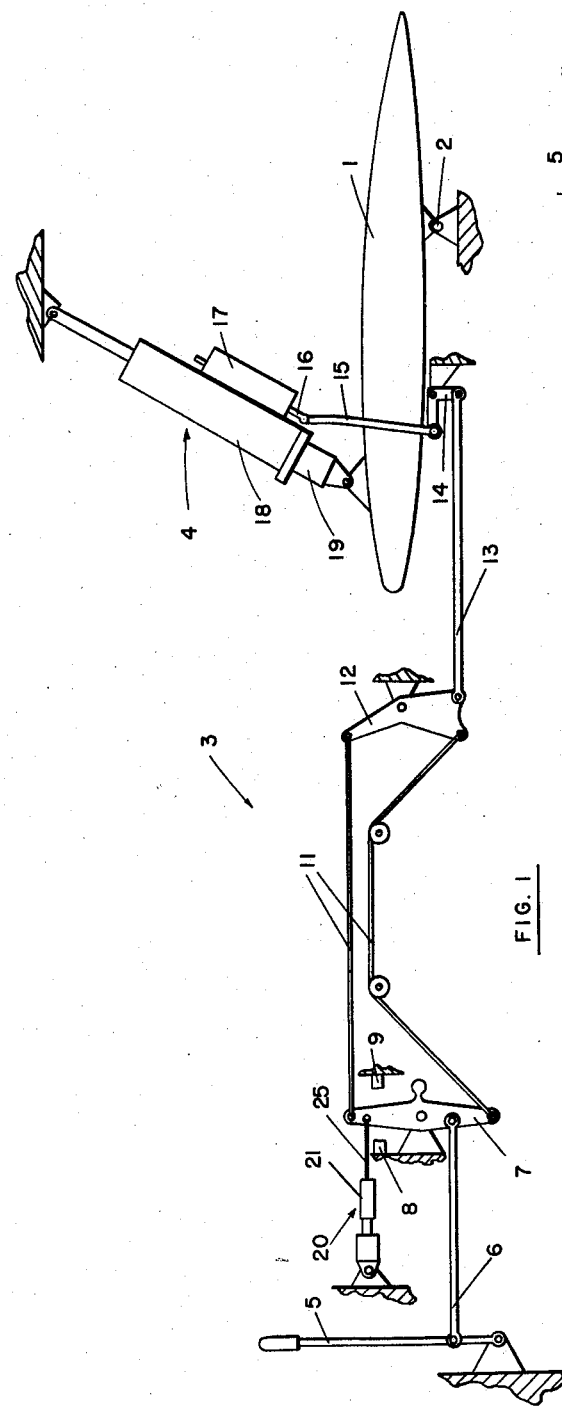
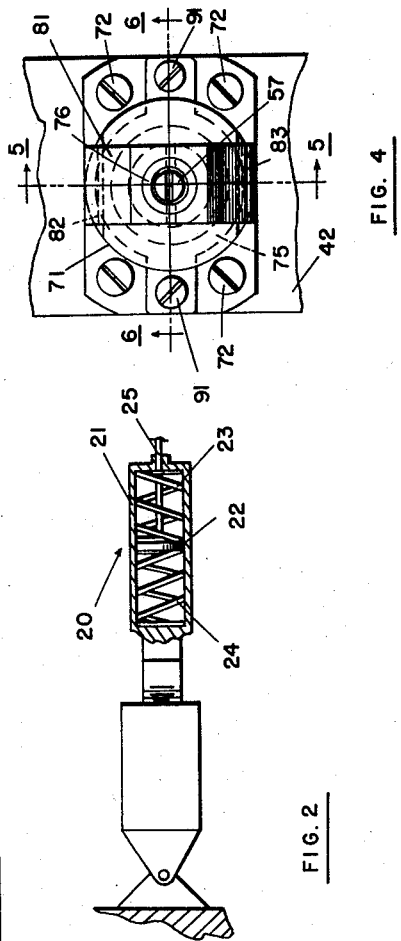
*INVENTORS*
MILTON KNOPF
OTTO J. BORNGESSER
BY
*William R. Lane*
ATTORNEY Nov. 11, 1958 M. KNOPF ET AL 2,859,621
AIRCRAFT CONTROL INSPECTION DEVICE
Filed April 28, 1955 5 Sheets-Sheet 2

INVENTORS
MILTON KNOPF
OTTO J. BORNGESSER
BY
William R. Lane
ATTORNEY

Nov. 11, 1958    M. KNOPF ET AL    2,859,621
AIRCRAFT CONTROL INSPECTION DEVICE
Filed April 28, 1955    5 Sheets-Sheet 3

INVENTORS
MILTON KNOPF
OTTO J. BORNGESSER
BY
*William R. Lane*
ATTORNEY

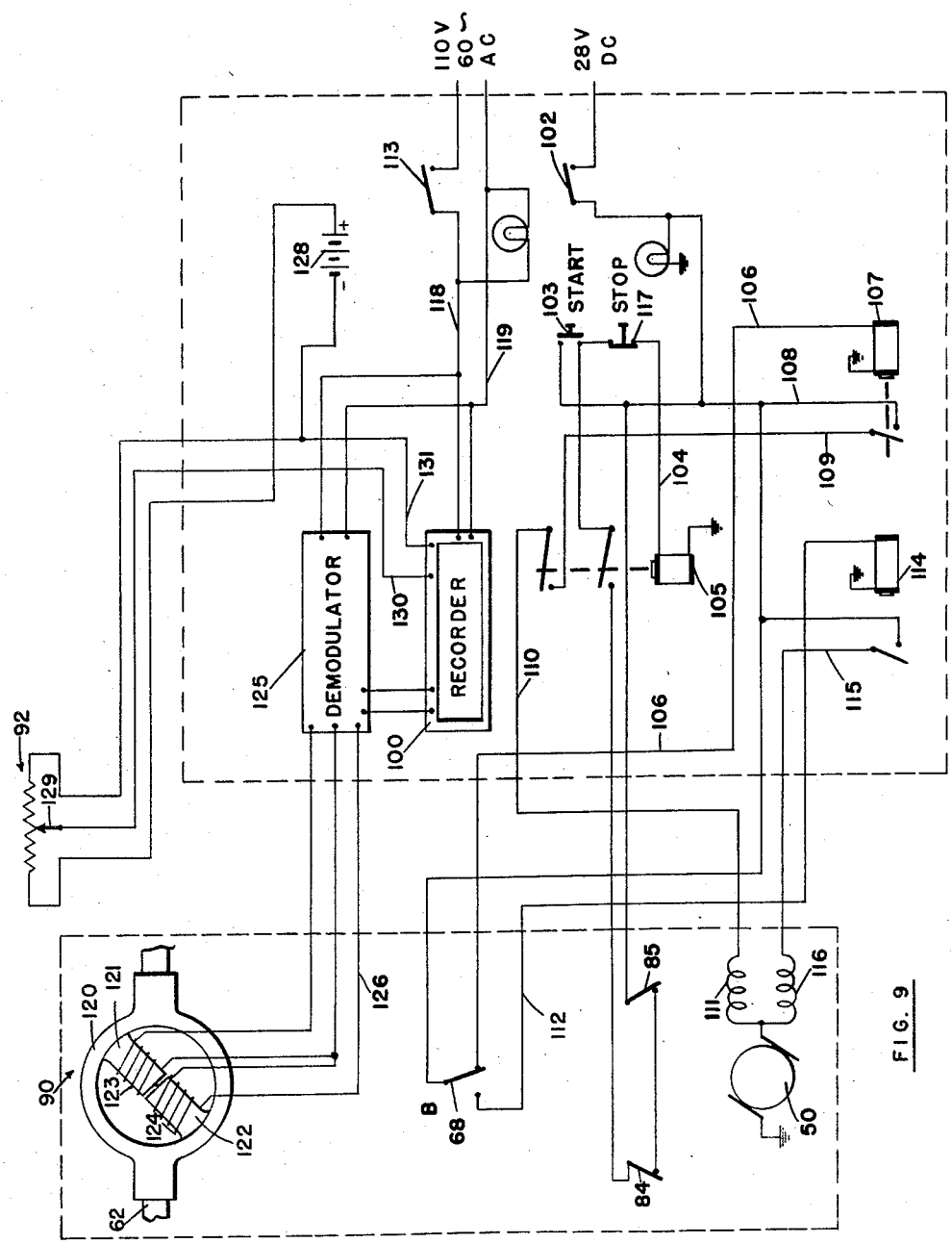

United States Patent Office 2,859,621
Patented Nov. 11, 1958

2,859,621

AIRCRAFT CONTROL INSPECTION DEVICE

Milton Knopf, Los Angeles, and Otto J. Borngesser, Hermosa Beach, Calif., assignors to North American Aviation, Inc.

Application April 28, 1955, Serial No. 504,651

9 Claims. (Cl. 73—432)

This invention pertains to an inspection device and more particularly to a device for inspecting the controls for aircraft having a fully power-operated control system.

As aircraft have increased in speed performance it has become necessary to equip these aircraft with fully power operated irreversible control systems. This is because at high Mach numbers the amount of force required to move a control surface becomes too great for satisfactory pilot control. Therefore, the aircraft is constructed in such a manner that the pilot's stick, through links and cables, operates a valve connected to a hydraulic cylinder. The pump supplying fluid to the hydraulic cylinder then does the work of moving the control surface and the arrangement will be irreversible in that no force can be transmitted back from the surface through the control linkage to the pilot's stick.

It is necessary for such an arrangement to build into the control system a resistance to the movement of the control stick so that the pilot will be able to tell by the amount of force he is exerting the location of the control surface and what may be expected from further movement in either direction. In order for the pilot to be able to fly the airplane to its maximum performance potential and for the flight to be as safe as possible throughout the range of speed and maneuvers, this "artificial feel" force must be held to great accuracy for all positions of the manually operated control member. To assure the necessary precision for the control systems of aircraft having such full power systems the control inspection device of this invention has been devised. This invention includes a constant speed power drive for the control assembly, reversible so as to drive the pilot's stick through its entire range of movement. Electrical signals representing the force exerted for such movement and the displacement of the control assembly are produced. These are fed to a graphical X–Y plotter where they are simultaneously recorded and plotted.

Accordingly, it is an object of this invention to provide a control inspection device for an aircraft system having appreciable resistance to control movement. Another object of this invention is to provide a control inspection device which eliminates all human error in the inspection procedure. A further object of this invention is to provide a control inspection device which operates with great accuracy but is automatic in its functions. Yet another object of this invention is to provide a control inspection device which will give a permanent record of the inspection results for each inspection procedure. These and other objects will become apparent from the following detailed description taken in connection with the accompanying drawings in which—

Fig. 1 is a schematic view of a full power type control system to which this inspection device may be applied;

Fig. 2 is an enlarged detail view partially in section showing the artificial feel arrangement for the control system of Fig. 1;

Fig. 4 is a detail plan view of the force adjusting means for resisting movement of the bellcrank;

Fig. 9 is a general wiring diagram of the arrangement for the inspection device.

Figure 3:
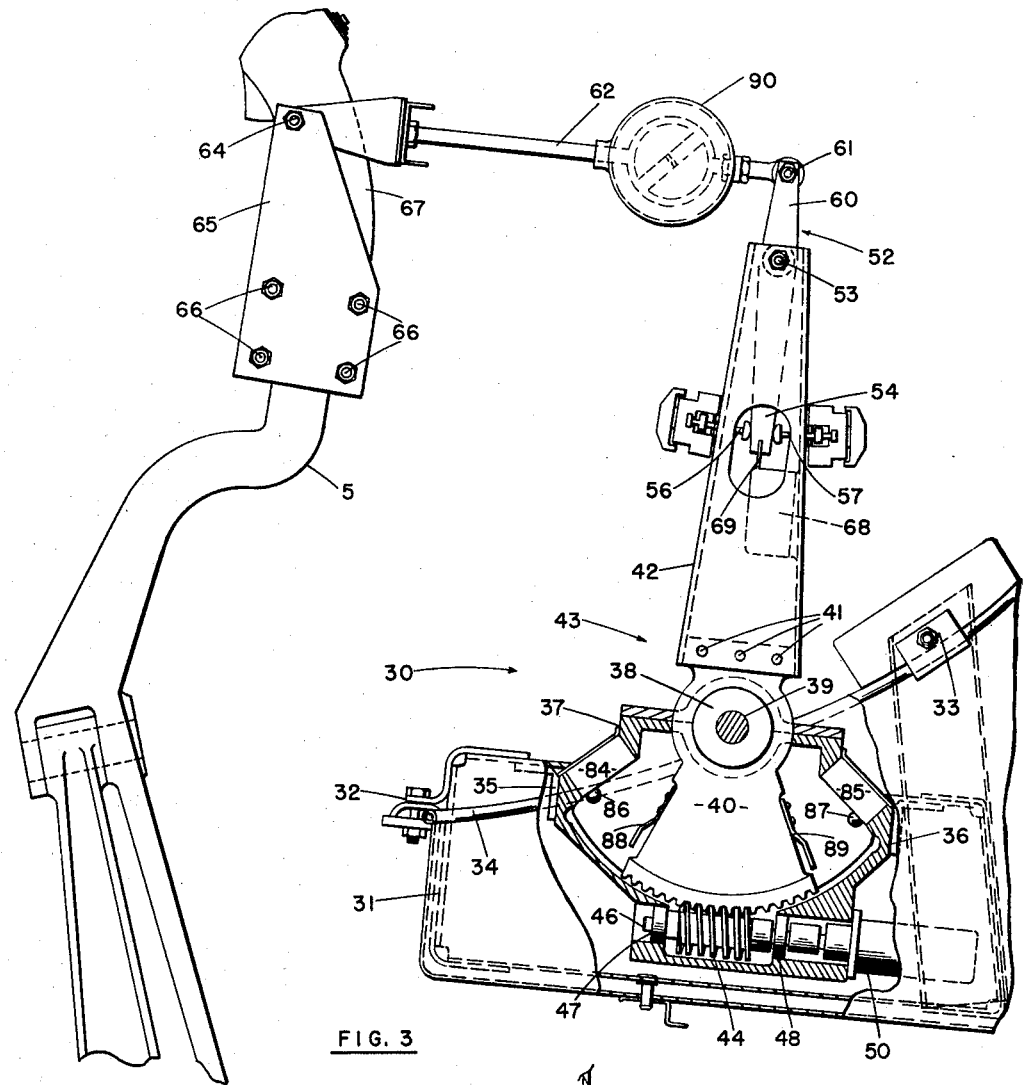
Fig. 3 is a side elevational view partially in section of the device of this invention as hooked up for driving a control stick.

Referring to the schematic illustration of Fig. 1, a typical aircraft control system may be seen. The control surface 1 in the illustration shown is the horizontal tail surface, but for other examples obviously may be an elevator, rudder or other power operated airfoil control member. The control surface 1 is pivoted at 2 to the fuselage so that the entire horizontal tail surface may be pivoted about shaft 2 to vary the lift provided by the tail.

To operate control surface 1, and forming a control assembly therewith, a control linkage 3 is connected with actuating means 4 which in turn pivots the control surface. Linkage 3 may include a pilot-operated control stick 5, pivotally mounted in the aircraft, which connects through forward link 6 to forward bellcrank 7, also pivotally mounted. Stops 8 and 9 limit the travel of the assembly in either direction by defining the range of movement of bellcrank 7. Cables 11 connect bellcrank 7 to pivotally mounted aft bellcrank 12 which is connected by rod 13 to crank 14. Rod 15 connects the other end of crank 14 to valve slider shaft 16 of the actuating means. Thus it is apparent that pivotal movement of control stick 5 will act through linkage 3 to cause linear movement of shaft 16 of actuating means 4.

The valve slider shaft is a portion of control valve 17 which is carried by and connects with hydraulic actuating cylinder 18 which is connected to control surface 1 through cylinder body portion 19. The control valve directs the admission of pressurized fluid into cylinder 18 which causes movement of the cylinder thereby effecting pivotal movement of the control surface. Control valve 17 is balanced so that no forces from the pressurized hydraulic fluid or from the control surface are transmitted to the valve. This means that in operating the linkage the pilot will meet with practically no resistance is actuating the control valve, and it is therefore necessary to provide the pilot with an artificial feel means so that he can determine the relative displacement of the control linkage and thus of the control valve and the control surface. This artificial feel is supplied by means of a bungee unit 20 which is connected in the control linkage at some suitable place such as on forward bellcrank 7. Fig. 2 illustrates the workings of the bungee unit which may include cylindrical body 21 in which disc 22 is yieldably positioned between compression springs 23 and 24. Disc 22 is attached to bellcrank 7 through rod 25 slidably passing through one end of body 21. The other end of the bungee body is secured to portions of the aircraft structure. This means that when the control stick 5 is moved, thus actuating the control linkage and deflecting bellcrank 7, bungee spring 23 or 24, depending upon the direction of movement, will be deflected which will transmit a resistance force to the pilot proportionate to the amount of displacement to the control linkage and thus of the control valve. In this manner the pilot is provided with a feel force enabling him to satisfactorily determine the position of the control surface 1. This force can be of any desired value by proper selection of the bungee springs.

Referring now to Fig. 3 the driving means 30 of the inspection device may be seen in elevation, partially broken away. In the arrangement illustrated the device includes a box-like housing 31 which is secured to fixed portions of the aircraft by suitable means such as clamps 32 and 33 attaching the housing to the seat framework 34. Obviously the attachment could be made to any convenient structure of the aircraft such as the formers running along either side of the cockpit.

Housing 31, by means of brackets 35 and 36, carries an inner housing 37. The upper portion of housing 37 mounts bearings 38 which journal a cross shaft 39. Rotatable with shaft 39 is a gear sector 40 the upper portion of which at 41 is secured to a hollow extension 42. In this manner the gear sector and extension 42 become a lever assembly 43 pivotal about the center line of shaft 39. The bottom portion of gear sector 40 engages and is drivable by a worm 44. The latter member is mounted on a shaft 46 extending through bearings 47 and 48 driven by a substantially constant speed reversible electric motor 50. Rotation of the motor thereby effects pivotal movement of the drive member formed by the gear sector and its extension 42 about shaft 39.

Extension 42 at its upper end pivotally carries a bellcrank 52 by means of pin 53. Normally there is no rotation of bellcrank 52 about pin 53 because the lower end 54 of the bellcrank is engaged on either side by spring pressed plungers 56 and 57. The detailed arrangement of these plungers will be made more clear hereinafter. The upper end 60 of the bellcrank engages at 61 a rod 62 which extends generally horizontally to pivotally engage at 64 an adapter 65. The adapter is attached by suitable means such as bolts 66 to the pilot's hand grip portion 67 of the control stick 5. Thus it can be seen that rotation of motor 50, through the gear sector and extension, the bellcrank and the cross rod, results in pivotal movement of control stick 5.

According to the arrangement of this invention automatic cycling of the control stick through its entire range of movement is obtained. To this end a reversing switch 68 is mounted on extension 42 of the pivotal link, the actuating arm 69 of which engages lower end 54 of the bellcrank with a connection to a slot in this end of the bellcrank as shown. This means that upon pivotal movement of bellcrank 52 in either direction relative to lever 42 switch 68 will be tripped. Normally as the motor drives the control stick the resistance offered by artificial feel bungee 20 is not sufficient to cause such pivotal movement of the bellcrank. However, when the stick reaches the end of its stroke in one direction the control assembly will engage stop 8 while in the other direction it will meet stop 9. The stick therefore can go no further and as motor 50 continues to drive pivotal lever 43 the force in bellcrank 52 will overcome the resistance of the plungers so as to allow the bellcrank to pivot relative to lever 42. Obviously if there is a compression force in rod 62 pivotal movement of the bellcrank will be clockwise and plunger 56 will be moved, while tension in link 62 causes counterclockwise movement of the bellcrank and plunger 57 is moved.

When the bellcrank pivots and the switch 68 is tripped, drive motor 50 will be caused to reverse its direction. This is accomplished by means of a suitable wiring arrangement the details of which will be brought out hereinafter. This construction means that the drive motor will cause the stick to be moved through its entire stroke until the end thereof when the stop is engaged whereupon switch 68 will cause the motor to automatically reverse the direction and pivot through its full movement in the opposite direction. Automatic reversal of the motor is again obtained at the end of the return stroke.

Figure 5:
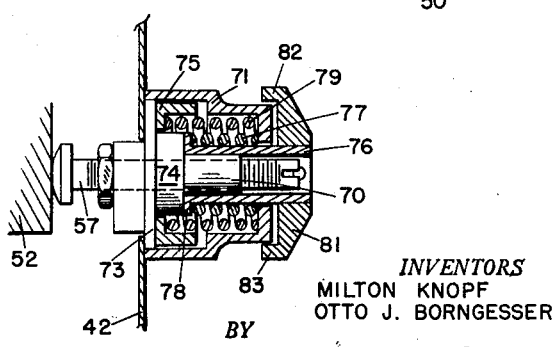
Fig. 5 is a sectional view taken along line 5—5 of Fig. 4.
Figure 6:
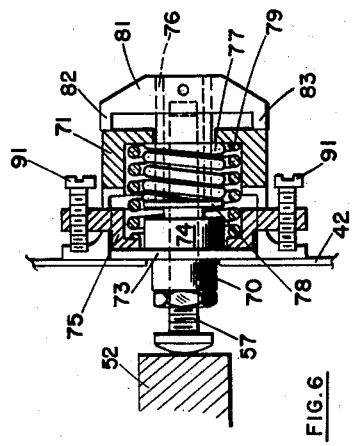
Fig. 6 is a sectional view taken along line 6—6 of Fig. 4, but with the handle rotated 90° to reduce the spring force.

The arrangement for providing the resilient loading on spring pressed plungers 56 and 57 is adjustable, the details of which may be seen by reference to Figs. 4, 5 and 6. The two units are similar in design so only one is shown and described. It can be seen that plunger 57 is threadably received in tubular member 70 and adjustable relative thereto so as to initially contact the surface of the bellcrank member. The outer casing 71 of the plunger unit is attached to member 42 of lever assembly 43 by means of screws 72. A plate 73 is slidable within this housing resting beneath enlarged collar 74 of tubular member 70 as well as underneath a cup member 75. The opposite side of collar 74 engages a sleeve 76 which is also slidable within the housing. Inner spring 77 bears against the underneath surface of the housing and flange 78 of sleeve 76, while an outer spring 79 engages the housing and the bottom of cup member 75. Therefore as the unit is shown in Fig. 5 the plunger must exert a force against plate 73 sufficient to overcome the resistance offered by the two springs in order to move relative to lever 42. Such a force is obtained only when the control system has engaged a stop at the end of the stroke and not during normal driving thereof.

It is possible to vary the amount of resistance which the plunger units afford, which may be necessary when the unit is being employed with an aircraft having a different control system or with a different control member of a particular airplane. For this purpose inner spring 77 is made inoperative while outer spring 79 affords all the resistance to plunger 57, whereby the amount of force required to move the plunger is materially reduced. To accomplish this handle 81, which is pinned to sleeve 76, is pulled outwardly and rotated ninety degrees. This means that projections 82 and 83 of the handle may be engaged with the outer surface of housing 71 thereby holding the handle in its outer position. With the handle so disposed sleeve 76, which is integral with the handle, holds spring 77 in a compressed position thereby freeing plate 73 from resistance from this spring. Only the outer spring 79 will oppose the plunger with this arrangement. Further adjustment of the force in spring 79 may be obtained by screws 91 which can be caused to engage lever 42 and compress spring 79.

In the event of failure of switch 68 safety switches 84 and 85 are mounted on housing 37 on either side of the gear sector. These switches are operated by plungers 86 and 87 engageable by arms 88 and 89 projecting from the gear sector. Switches 84 and 85 will break the circuit when tripped so as to prevent further operation of motor 50. This assures that the motor will not operate so as to cause damage to the drive unit.

Included with rod 62 is a force transducer 90 which will provide a signal representative of the amount of tension or compression force exerted on rod 62. This signal produced thereby will accordingly represent the amount of resistance which artificial feel bungee 20 is offering to movement of the control stick. Thus transducer 90 provides a signal which represents the amount of feel in the system.

Figure 7:
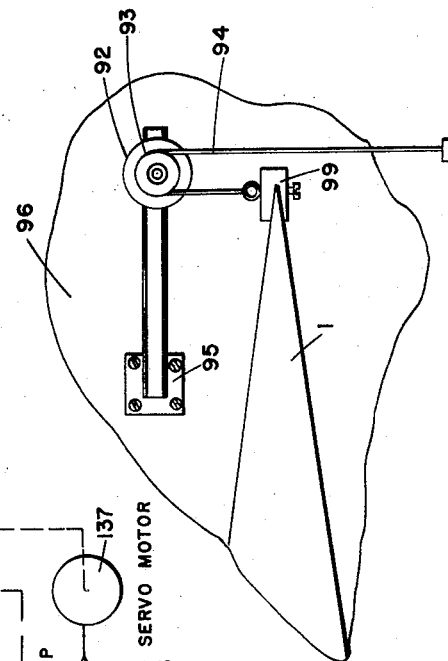
Fig. 7 is an enlarged detail view of the position indicating potentiometer attached to the control surface.

Also included in this system, and as shown in Fig. 7, is a means to obtain a signal which represents the position to which control surface 1 has been moved by the control stick. Thus the wiper of potentiometer 92 is attached to a pulley 93 which is rotated by a cable 94. The potentiometer itself is attached by a suitable bracket 95 to fuselage 96. One end of cable 94 is provided with a weight 98 while the opposite end is attached by clamp 99 to the end of the control surface 1. Movement of surface 1 thereby rotates the pulley moving the wiper of the potentiometer so as to vary the signal produced thereby. A torsion spring may be employed in lieu of the weight and cable, but the latter have been shown for clarity. The two signals representing a force exerted and distance moved are then fed to a recorder 100 which is preferably a two axis graphic instrument known in the art as an X-Y plotter. Such a unit will receive the two signals and automatically plot a graph of one against the other as seen for example in Fig. 8. This represents a typical graph provided by the X-Y plotter when utilized in connection with this invention, taken from an actual trace made during an inspection run. The X axis represents surface deflection in either direction while on the Y axis may be seen the amount of force in either direction to cause such deflection. As the inspection device moves the control stick at a constant speed in one direction the curve may rise, for example, along line A to B where the stop in the control system will be engaged. The resistance offered by the stop causes switch 68 to be tripped reversing the direction of the drive motor and bringing the resistance force back down along line C as the control surface is returned. The line D continues down as the neutral displacement position is passed and the surface is deflected in the opposite direction. The resistance force again increases to E, a stop is engaged, reversal of the motor follows and the curve is returned to its original position along line F. The curve ABCDEF may be quickly checked to determine if the values which are plotted fall within acceptable limits. For convenience it is generally the practice to provide a band along lines A, C, D and F for establishing the limits within which they may vary.

It is preferred to make an additional inspection which is also possible with the unit of this invention. For this procedure the drive motor is stopped periodically during the reciprocal movement of the control stick rather than being run at a constant speed for the entire stroke. It should be observed that with a hydraulically driven system such as that normally employed in an aircraft having a full power control system the control valve will initially move a small distance before it has opened sufficiently to admit fluid into the driving cylinder so as to displace the control surface. Therefore, a resistance force will be encountered prior to any actual displacement of the control surface. Similarly when the valve is closed the surface must move a short distance to catch up to the valve before it is also brought to a stop. Therefore when the force on the control system is withdrawn as the inspection device is stopped the control surface will move a minor distance after that time. This causes the curve produced by such a procedure to have the small projections G which extend inwardly from the outer curve. When the complete cycle has been run in this manner, producing a plurality of the projections G as shown, the tips of these points may be interconnected, thereby providing a new inner curve. This second curve represents movement of the system free of any effect from rate of movement thereof. The only reason there is a difference between the rising curve A' for example and the descending curve C' is because of the friction afforded by the system. The outer curve represents not only the friction force but the force as obtained at the particular rate at which the control system is being moved. Thus an important inspection result is obtained whereby friction alone and friction plus movement may both be checked.

It should be emphasized that for obtaining the outer curve ABCDEF it is essential that the unit be moved at a constant velocity throughout the entire reciprocal range. Actually the shape of the curve may be altered almost at will if the rate of the movement is changed during the displacement of the control system. Therefore, in order to derive maximum information and to furnish a firm basis for analysis, there must be reasonably constant speed. The graph obtained represents a permanent record of the inspection which may be identified with the aircraft and retained for future reference purposes.

The wiring for the inspection device of this invention may vary somewhat, but may be accomplished as illustrated in Fig. 9. For the motor drive direct current passes through switch 102 to start button 103. When this button is pressed conductor 104 is connected to relay 105 closing the contacts thereof which locks the relay in so that it continues to be energized after the start button is released. It may be seen that with the position of switch 68 illustrated in Fig. 9 after the start button has been pressed current may pass through conductor 106 to relay 107, closing its contact. Current can then pass through conductors 108, 109 and 110 to winding 111 of motor 50, causing the motor to operate in one direction. When switch 68 is moved to its opposite position, being connected then to conductor 112, the circuit to relay 107 will be broken while it will be made to relay 114, closing its contact. Current therefore passes through conductor 115 to winding 116 of the motor to cause its rotation in the opposite direction. Safety switches 84 and 85 will break the current to relay 105 if they are opened thereby stopping the operation of the motor. Similarly stop button 117 will break the contact to relay 105 and halt the motor.

A source of alternating current is provided for the unit connecting through switch 113, conductors 118 and 119 to demodulator 125, from which it is transmitted to the force transducer 90. The latter member may assume a variety of forms but in the embodiment illustrated comprises a ring shaped member 120 which connects to the cross rod 62 and absorbs the tension and compression forces therein. Integral with the ring portion are core elements 121 and 122 which are spaced apart at their ends so as to leave an air gap therebetween. A coil 123 is wound around core 121 and receives the alternating current while coil 124 is around the other of the two cores. The current in coil 123 will, of course, induce a current in the second coil 124 which through conductor 126 and a common ground will be returned to the demodulator. The amount of current which is induced in second coil 124 will depend upon the spacing between the ends of the two cores, and the latter is dependent upon the amount of force in tension or compression which is exerted on the force ring. Obviously when the ring is under tension the gap increases less current is induced into coil 124 than is the case where the ring is under compressive forces and the gap between the core elements is decreased. The signal induced into coil 124 is demodulated in the demodulator and then fed to the recorder.

Potentiometer 92 may also be seen in Fig. 9, this including a source of direct current 128 and a wiper 129 whereby the signal which the potentiometer sends to the recorder through conductors 130 and 131 will be varied by the position of the wiper along the resistance.

Figure 10:
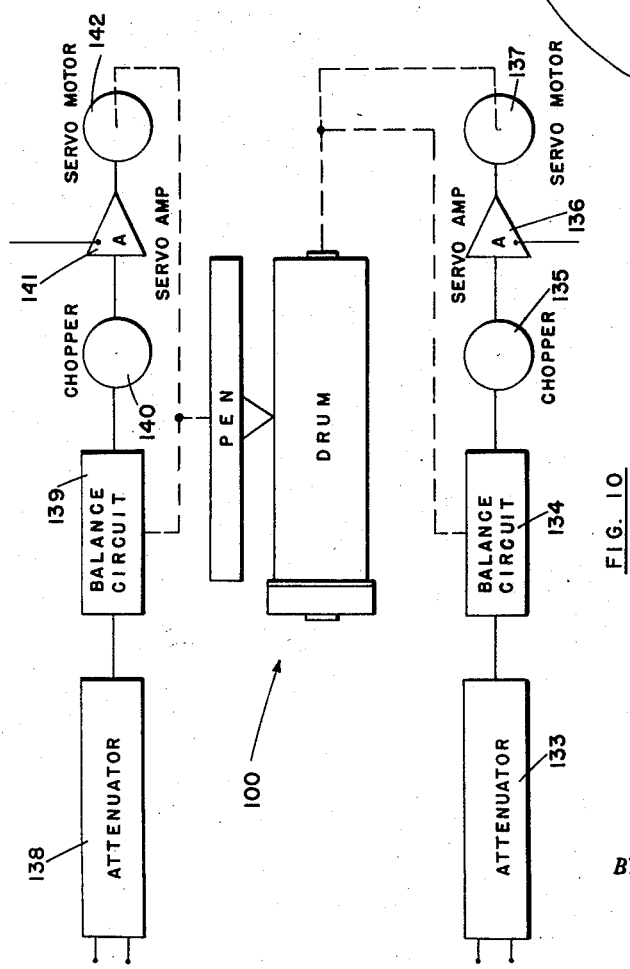
Fig. 10 is a wiring diagram of the X–Y plotter for recording the inspection results.
Figure 8:
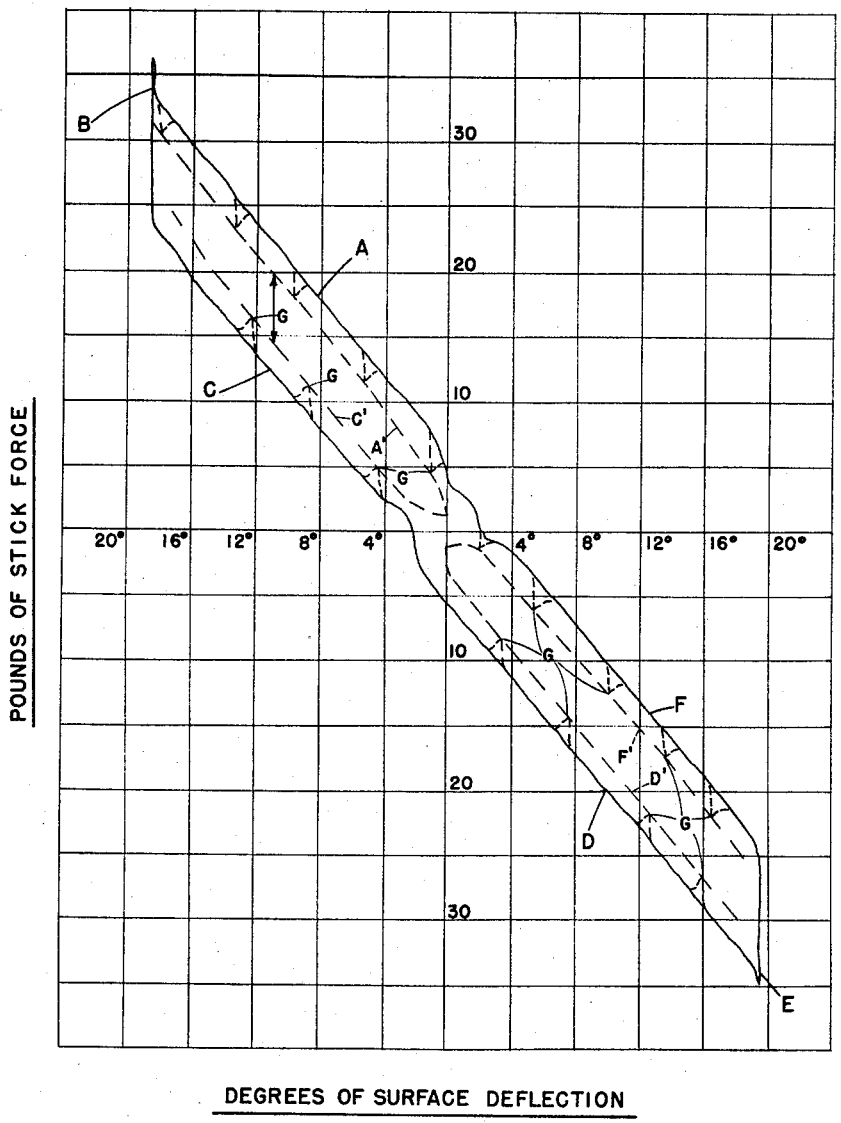
Fig. 8 is a graph as recorded in operation of the device of this invention.

It is also possible to obtain a satisfactory wiring arrangement from a single alternating current source. One advantage of the latter is greater ease of obtaining a constant speed drive for the stick. A typical arrangement for a recording instrument suitable for providing the X-Y graphical representation as shown in Fig. 8 is illustrated by the diagram of Fig. 10. The signal from the force ring representing the amount of tension or compression therein, and thus the resistance offered by the artificial feel bungee, is conducted to attenuator 133, to balance circuit 134 and then to a chopper 135. The signal is then amplified at 136 and conducted to one winding of the two phase servo motor 137 which is mechanically connected to a drum on which the graph paper has been attached. Alternating current is brought into amplifier 136 and is also directed to the other coil of the two phase servo motor. The follow up for the balance circuit stops the motor when the signal from the force ring has been balanced by the opposing signal.

The circuit for the pen to inscribe the graph on the drum is similar. Thus the signal from the potentiometer 92 goes through attenuator 138, balance circuit 139, chopper 140 and amplifier 141 to one winding of servo motor 142. The pen is thereby caused to move along the graph paper as the drum is rotated and the graphical representation is obtained.

It should be emphasized that the inspection device of this invention is not limited to determining and recording the values of stick force plotted against deflection of a control surface. For example, it may be desired to inspect for stick force against stick displacement, in which case the wiper of position transmitting potentiometer 92 would be attached to the stick rather than control surface 1. In another situation it might be required to determine the force in another element of the control assembly, in which case rod 62, or its equivalent, would engage and drive this element, while potentiometer 92 indicated distance displaced by this or another part of the assembly. Wherever there is a problem of determining and plotting force and distance, this device may be used.

It is apparent from the foregoing that we have provided an inspection device for aircraft having a resistance to movement of its control system which performs a function which was literally impossible in the prior art. Without a device such as this there is no means of determining the amount of resistance offered at a given displacement of the control assembly while the assembly is moved at a constant rate. No manually operated device can give the speed control which is necessary. In spite of this the device is very simple to operate and relatively simple in construction. The matter of inspecting a control system is taken care of in a short time yet a complete accurate record of the results remains. This means that not only is the inspection procedure for aircraft greatly improved but the quality of the aircraft obtained will be enhanced because malfunctioning heretofore undetectable by any manual check may now be discovered and corrected.

The foregoing detailed description is to be understood as given by way of illustration and example, the spirit and scope of this invention being limited only by the appended claims.

We claim:

1. An inspection device for an aircraft control assembly reciprocal through a stroke with resistance to such reciprocal movement, and having stop means at either end of said stroke, said device comprising reversible substantially constant speed drive means operatively connected to said assembly for causing movement of the same, said drive means including a reversing means operative in response to resistance encountered when said control assembly engages a stop means to reverse said drive means, thereby reciprocating said assembly, said drive means including a force sensing means for sensing the amount of force exerted thereby in effecting such movement of said assembly; position sensing means connected to said assembly for sensing the position thereof; and recording means connected to both of said sensing means for simultaneously recording said force and said position.

2. A device as recited in claim 1 in which said drive means for moving said control assembly comprises a pivotal lever; power means to effect pivotal movement of said lever in either direction; a bellcrank carried by said lever; means drivingly interconnecting said bellcrank and said control member; lever and bellcrank controlling means including resilient means on said lever engaging said bellcrank for resisting pivotal movement of the latter relative to said lever below a predetermined load, and signal transmitting means interconnecting said lever and bellcrank controlling means and said power means for reversing direction of said power means upon pivotal movement of said bellcrank relative to said lever.

3. An inspection device for an aircraft control assembly reciprocal through a stroke with resistance to such movement, and having stop means at either end of said stroke, said device comprising a reversible power operated drive member; a link means connected to said drive member and said control assembly, the connection to said drive member including resilient means normally providing a rigid connection for transmitting forces from said drive member to said link means and causing said link means to move therewith whereby said link means causes such movement of said assembly, and yieldable at either end of said stroke when said assembly engages said stop means to permit relative movement between said link means and said drive member; reversing means interconnecting said link means and said drive member to effect reversal of said drive member upon such relative movement of said link means and drive member; force sensing means on said link means for sensing the force exerted thereby; position sensing means engaging said assembly for sensing the position thereof; and plotter means connected to both of said sensing means for simultaneously plotting said sensed force and position in graphical form.

4. An inspection device for an aircraft control assembly reciprocal through a stroke, having a resistance to such movement through said stroke and a stop at either end of said stroke, said device comprising a drive assembly, said drive assembly including a reversible constant speed power means for effecting movement thereof; link means operatively engaging said control assembly so that movement of said link means effects movement of said control assembly, said link means being movable relative to said drive assembly; resilient means interconnecting said link means and said drive assembly for transmitting forces from said drive assembly to said link means and normally preventing such relative movement during movement of said control assembly through said stroke while permitting such relative movement at either end of said stroke, said resilient means being adjustable to control the amount of force required to cause such relative movement; means connected to said link means and said power means for effecting reversal of said power means upon such relative movement; force sensing means connected to said link means for sensing the amount of force exerted by said link means; position sensing means engaging said assembly for sensing the position of said assembly; and recording means for simultaneously recording said force and said position.

5. An inspection device for an aircraft control system having an assembly comprised of an interconnected airfoil and manually operable member for moving the same, said device comprising a first pivotal lever; power means for effecting pivotal movement of said lever; a second pivotal lever carried by said first pivotal lever; force transmitting means operatively interconnecting said second pivotal lever and said manually operable member whereby movement of said second pivotal lever effects movement of said manually operable member; force sensing means connected to said force transmitting means for sensing the amount of force required for movement of said member; spring pressed plunger means on said first pivotal lever engaging opposite sides of said second pivotal lever for opposing pivotal movement in either direction of said second pivotal lever relative to said first pivotal lever until exertion of a predetermined force; means interconnecting said pivotal levers and said power means for reversing the direction of operation of the same upon such pivotal movement of said second pivotal lever relative to said first pivotal lever whereby said pivotal levers are caused to reverse direction; means connected to said airfoil for sensing the position thereof; and X-Y plotter means connected to both of said sensing means for simultaneously plotting said force and said position.

6. An inspection device for an aircraft control system having an assembly of an interconnected airfoil and manually operable member for moving the same, said assembly having an appreciable resistance to movement thereof, said device comprising a pivotal lever; means for effecting pivotal movement of said lever in either direction; a bellcrank carried by said lever; resilient means on said lever engaging said bellcrank for resisting pivotal movement in either direction of said bellcrank relative to said lever to cause said bellcrank to pivot with said lever for normal forces thereon less than a predetermined value; force transmitting means interconnecting said bellcrank and said control member for causing said control member to move with said bellcrank, said force transmitting means including force sensing means to provide a signal responsive to the force exerted by said force transmitting means in moving said control member; means connected to said airfoil and responsive to the position thereof to provide a signal representing such position; and recording means connected to said sensing means for receiving said signals and simultaneously registering said force and said position.

7. An inspection device for an aircraft having a reciprocal control assembly having appreciable resistance to movement, and stop means at either end of its stroke, said device comprising a drive linkage, said drive linkage including connecting means operatively engaging said control assembly, reversible power means connected to said drive linkage for effecting substantially constant speed movement thereof thereby to move said control assembly, means connected to said linkage for sensing the force required to effect such movement of said control assembly, means connected to said control assembly for sensing the position of said control assembly during such movement, and recording means connected to both of said sensing means for simultaneously registering said force and said position, said drive linkage including means responsive to resistance imposed on said linkage from engagement of said control assembly with said stop means for reversing said power means.

8. An inspection device for an aircraft control assembly reciprocal through a stroke with resistance to such reciprocal movement and having stop means at either end of said stroke, said device comprising reversible substantially constant speed drive means operatively connected to said assembly for causing movement of the same, said drive means including two relatively movable parts, said parts being fixed with respect to each other during movement of said control assembly through its entire stroke and constructed to transmit driving force to said assembly during said stroke and relatively movable upon engagement of said control assembly with a stop means, said drive means further including means connected to said relatively movable parts for causing reversal of said drive means upon such relative movement thereof whereby said drive means reciprocates said control assembly, said drive means including a force sensing means for sensing the amount of force exerted thereby in effecting such movement of said assembly, position sensing means connected to said assembly for sensing the position thereof, and recording means connected to both of said sensing means for simultaneously recording said force and said position.

9. An inspection device for an aircraft having a reciprocal control assembly having appreciable resistance to movement and stop means at either end of its stroke, said device comprising a drive linkage, said drive linkage including connecting means operatively engaging said assembly; power means connected to said drive linkage for effecting substantially constant speed movement thereof thereby to move said control assembly, said power means including means sensitive to resistance of said assembly upon engagement thereof with a stop means for reversing the direction thereof, thereby to effect reciprocation of said assembly; means connected to said linkage for sensing the force required to effect such movement of said assembly; means connected to said assembly for sensing the position of said control assembly during such movement; and recording means connected to both said sensing means for simultaneously registering said force and said position, said recording means comprising an X–Y plotter for registering said force and said position in graphical form.

References Cited in the file of this patent

UNITED STATES PATENTS

| 575,202 | Bedell | Jan. 12, 1897 |
| 1,931,925 | Hopkins | Oct. 24, 1933 |
| 2,049,644 | Essen | Aug. 4, 1936 |
| 2,346,981 | Manjoine | Apr. 18, 1944 |
| 2,383,554 | Krickler | Aug. 28, 1945 |
| 2,587,628 | King | Mar. 4, 1952 |
| 2,660,383 | Feeney et al. | Nov. 24, 1953 |
| 2,750,795 | Federn | June 19, 1956 |

FOREIGN PATENTS

| 630,368 | Germany | Aug. 4, 1935 |
| 740,068 | Germany | Oct. 11, 1943 |